(12) United States Patent
Glaz

(10) Patent No.: US 10,618,584 B1
(45) Date of Patent: Apr. 14, 2020

(54) DEVICE FOR SECURING A RIDER TO A BICYCLE

(71) Applicant: John Glaz, Cold Spring Hills, NY (US)

(72) Inventor: John Glaz, Cold Spring Hills, NY (US)

( * ) Notice: Subject to any disclaimer, the term of this patent is extended or adjusted under 35 U.S.C. 154(b) by 0 days.

(21) Appl. No.: 16/434,814

(22) Filed: Jun. 7, 2019

(51) Int. Cl.
| | |
|---|---|
| *B62J 1/28* | (2006.01) |
| *B62J 11/20* | (2020.01) |
| *B60R 22/18* | (2006.01) |
| *B60R 22/34* | (2006.01) |

(52) U.S. Cl.
CPC .............. *B62J 1/28* (2013.01); *B60R 22/18* (2013.01); *B60R 22/34* (2013.01); *B62J 11/20* (2020.02)

(58) Field of Classification Search
CPC ...... B62J 2099/0073; B62J 1/28; B62J 27/00; B62J 2027/005; B62J 11/20; B60R 22/18; B60R 22/34
USPC .......................... 280/290; 297/479, 485, 465
See application file for complete search history.

(56) References Cited

U.S. PATENT DOCUMENTS

| | | | |
|---|---|---|---|
| 602,609 A * | 4/1898 | Tatro | |
| 635,683 A * | 10/1899 | Herman | |
| 735,573 A * | 8/1903 | Oleszkiewicz | |
| 742,800 A * | 10/1903 | Patten | |
| 4,161,328 A * | 7/1979 | Efros | B62J 99/00 280/290 |
| 2006/0157957 A1* | 7/2006 | Bever | B62J 1/00 280/290 |

FOREIGN PATENT DOCUMENTS

WO    2015/085344    * 6/2015    ............. B62M 1/00

* cited by examiner

*Primary Examiner* — Anne Marie M Boehler
(74) *Attorney, Agent, or Firm* — Scully, Scott, Murphy & Presser, P.C.

(57) ABSTRACT

The present disclosure is directed to a rider securing device that includes a rider restraint, wherein the rider restraint is mountable to a portion of a bicycle, and wherein the rider restraint comprises pressing arm configured to contact and move a plunger, when the plunger is in a first position, a ball catch is securable within a catch opening, when the plunger is in a second position, the ball catch is removable from the catch opening; a cable adjuster configured to attach to the ball catch, wherein the cable adjuster comprises an adjustable amount of an adjuster cable; and a handle, the handle comprising a first arm and a second arm, wherein the second arm comprises a cable anchor configured to attach to the second end of the cable.

7 Claims, 5 Drawing Sheets

DEVICE FOR SECURING A RIDER TO A BICYCLE

BACKGROUND OF THE DISCLOSURE

Bicycles and other human powered devices and machines are typically efficient overall at converting effort into movement. However, with each stroke of the pedal, the down force applied by the rider's foot causes at least a portion of their weight to lift away from the machine or bicycle. Thus, this effort in moving the rider's weight causes an inefficiency in driving the machine or bicycle forward.

What is desired is a way to releasably secure the rider, at a fixed length, to the structure of the machine or bicycle, so that each time the rider presses a pedal down with their foot, little or none of that effort is translated to lifting the rider's weight away from the structure of the machine or bicycle.

Embodiments of the present disclosure provide devices and methods that address the above needs.

SUMMARY OF THE DISCLOSURE

The present disclosure is directed to a rider securing device that includes a rider restraint, wherein the rider restraint is mountable to a portion of a bicycle, and wherein the rider restraint comprises pressing arm configured to contact and move a plunger, when the plunger is in a first position, a ball catch is securable within a catch opening, when the plunger is in a second position, the ball catch is removable from the catch opening, a cable adjuster configured to attach to the ball catch, wherein the cable adjuster comprises an adjustable amount of an adjuster cable; and a handle, the handle comprising a first arm and a second arm, wherein the second arm comprises a cable anchor configured to attach to the second end of the cable.

BRIEF DESCRIPTION OF THE DRAWINGS

The present disclosure will be better understood by reference to the following drawings, which are provided as illustrative of certain embodiments of the subject application, and not meant to limit the scope of the present disclosure.

DETAILED DESCRIPTION OF THE DISCLOSURE

Figure 1:
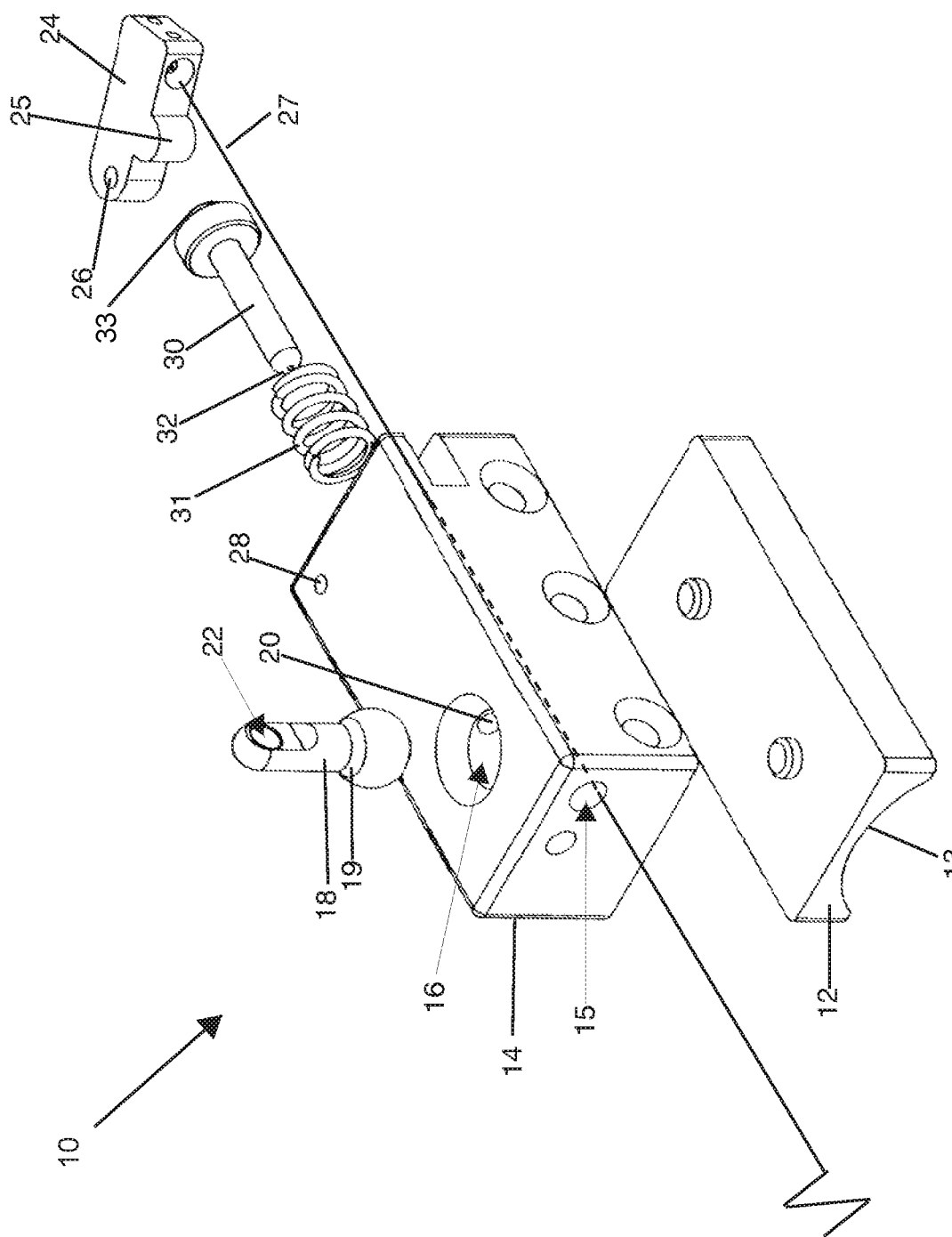
FIG. 1 is an exploded view of a rider restraint.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either be completely flat, or so nearly flat that the effect would be the same as if it were completely flat.

As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one embodiment", "certain embodiments", some embodiments" or "an embodiment", indicate that the embodiment(s) described may include a particular feature or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. For purposes of the description hereinafter, the terms "upper", "lower", "right", "left", "vertical", "horizontal", "top", "bottom", and derivatives thereof shall relate to the invention, as it is oriented in the drawing figures. The terms "overlying", "atop", "positioned on" or "positioned atop" means that a first element, is present on a second element, wherein intervening elements interface between the first element and the second element. The term "direct contact" or "attached to" means that a first element, and a second element, are connected without any intermediary element at the interface of the two elements.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

As used herein the term "bicycle" is intended in its broadest sense, and includes but is not limited to mountain bicycles, road (or street) bicycles, electrically assisted bicycles, recumbent bicycles, triathlon style bicycles, and stationary (or gymnasium-type exercise) bicycles. Although bicycles typically have two wheels, in the present application the term is intended to capture other machines with one, three or more wheels that receive at least some power from human effort to move the machine forward.

The present disclosure is directed to a device that can releasably secure a rider to a bicycle. One element of the device is a rider restraint 10, as shown in FIG. 1. FIG. 1 is an exploded view of the rider restraint 10. The rider restraint 10 includes a base 12, which has a curved contact surface 13, which is configured to contact a top tube of a bicycle. The shape and/or curvature of contact surface 13 can be designed for any shape and configuration of top tube.

A top 14 of the rider restraint 10 can be attached to base 12 in any suitable way. In this embodiment top 14 and base 12 are shown as two elements, but, in other embodiments, they can be a single piece of material.

The top 14 is shown as substantially rectangular, but can be any other shape that is capable of performing the below discussed features. The top 14 includes a transverse opening 15, which extends from one end of the top 14 to the other.

Further, top 14 includes a catch opening 16 that extends a distance vertically into the top 14. The catch opening 16 is configured to accept a ball catch 18, so that a ball portion 19 of the ball catch 18 extends deep enough into catch opening 16 that the upper edge of ball portion 19 is below a plunger opening 20. Although not shown, the catch opening 16 can also include a détente to maintain ball catch 18 within the catch opening 16 when no other force is maintaining the ball catch 18 within the catch opening 16.

Figure 2:
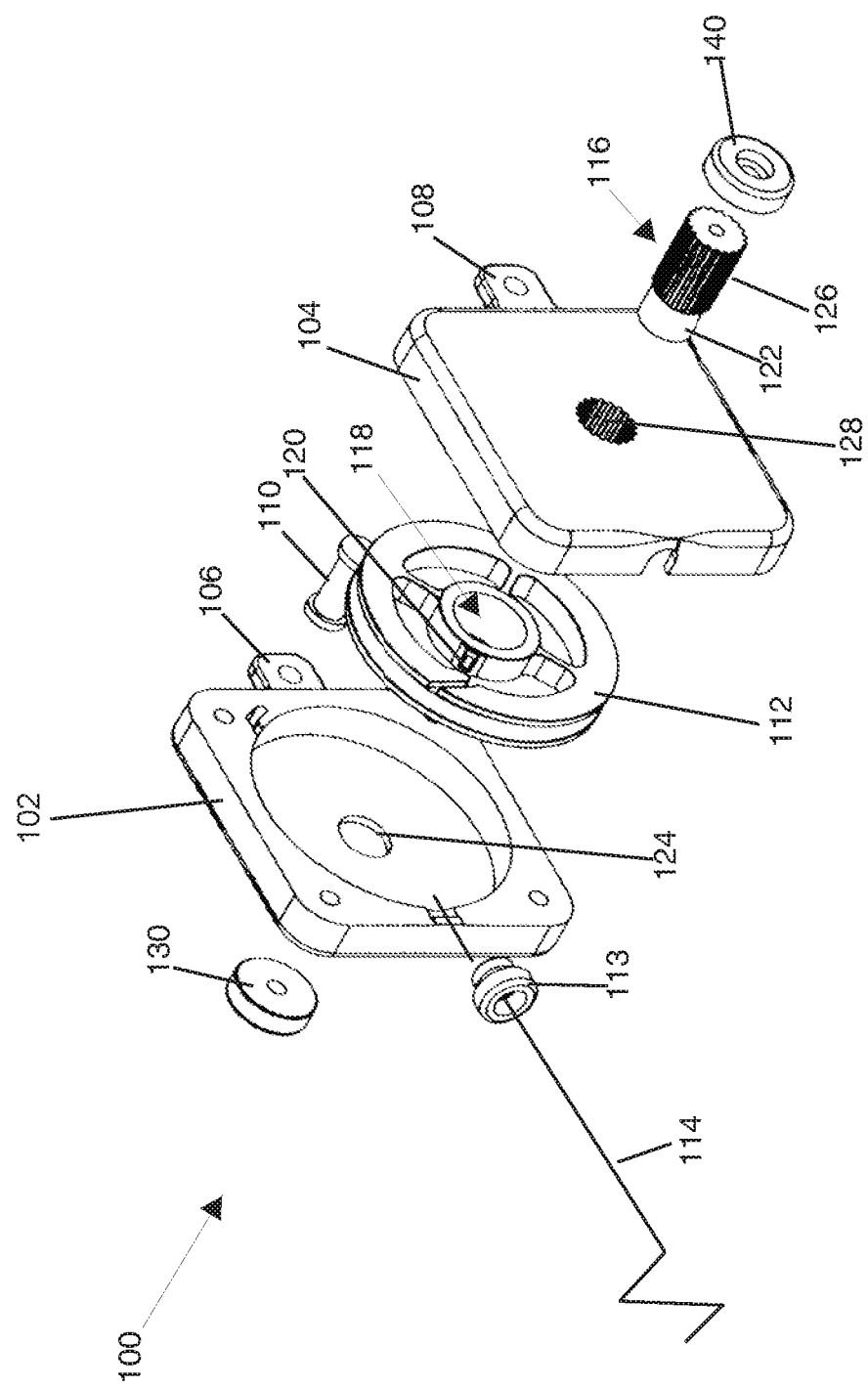
FIG. 2 is an exploded view of the cable adjuster.

Attached to an upper portion of the ball catch 18 is a cable adjuster, described in reference to FIG. 2, which can connect to the ball catch 18 through a ball catch opening 22. In FIG. 1, one end of the cable adjuster is attached to the ball catch 18 in any suitable way, with the other end of the cable adjuster attached, through a cable described below, to a body of a rider (not shown).

The rider restraint 10 can also include a pressing arm 24 that is configured to rotate about a hinge 26 that extends through a hinge opening 28 of top 14. The pressing arm 24 includes a bulge 25 that is configured to contact a top 33 of plunger 30 upon rotation of the pressing arm 24. The plunger is configured to extend through a spring and into an opening of the top 14, so that a plunger end 32 extends through the plunger opening 20, and when the ball catch 18 is within the catch opening 16, the plunger end 32 contacts the ball portion 19, thereby not allowing ball catch 18 to exit the catch opening 16 if a vertical force is applied to the ball catch 18 through the cable adjuster.

The pressing arm 24 is configured to rotate in two directions, clockwise and counter-clockwise about hinge opening 28. To rotate clockwise, one end of a cable 27 is attached to the pressing arm 24, and the cable 27 is pulled towards the transverse opening 15. This pulling of the cable 27 is discussed below. This clockwise rotation causes the bulge 25 to contact the top 33 of plunger 30, and cause plunger end 32 to extend through plunger opening 20.

When the cable 27 is not pulled, the spring 31 exerts a force on plunger 30, which contacts bulge 25, causing pressing arm to rotate counter-clockwise about hinge opening 28, thus withdrawing plunger tip 32 from plunger opening 20 and allowing withdrawal of ball catch 18 from catch opening 16 upon application of a vertical force through the cable adjuster.

An exploded view of the cable adjuster 100 is shown in FIG. 2.

The cable adjuster 100 includes a first cover 102 and a second cover 104 that are configured to connect to each other in any suitable way. The first cover 102 includes a first tab 106, the second cover 104 includes a second tab 108. Each of the first tab 106 and the second tab 108 include a hole so that a pin 110, or the like, can extend through the first tab 106, the ball catch opening (shown in FIG. 1 as reference 22) and the second tab 108, thus rotatably securing the cable adjuster 100 to the ball catch (shown in FIG. 1 as reference 18).

An adjuster cable 114 extends into the space between the first cover 102 and the second cover 104 through a grommet 113. One end of the adjuster cable 114 can attach to a rider of the bicycle through a harness system worn by the rider and/or to a portion of the rider's body directly. The other end of the adjuster cable 114 extends past grommet 113, and can be wound about a spindle 112.

The spindle 112 is configured to store a sufficient amount of adjuster cable 114, so that a rider of the bicycle can adjust the length of adjuster cable 114 outside of the grommet 113, thus adjusting how close to the rider can be fixed to the cable adjuster 100.

How the length of the adjuster cable 114 outside the grommet 113 is adjusted is now described. The spindle 112 is configured with a spindle opening 118, which is configured to accept an axle 116 to pass therethrough.

To prevent rotation of the spindle 112 about the axle 116 (thus maintaining the amount of adjuster cable 114 outside the grommet 113 when a force is applied to the adjuster cable 114) the axle 116 can be pressed, and slid towards second cover 104, so that axle teeth 126 engage toothed opening 128. To allow rotation of the spindle 112 about the axle 116 (thus allowing for the amount of adjuster cable 114 outside the grommet to extend when a force is applied to the adjuster cable 114) the axle 116 is pressed, and slid towards first cover 102, so that substantially smooth axle portion 122 contacts substantially smooth opening 124. Washers 130 and 140 can be attached to the substantially smooth axle portion 122 and the axle teeth 126, respectively, so that the axle 116 does not completely exit the cable adjuster 100.

The spindle 112 can be fixed to the axle 116 by a set screw 120, or the like. Alternatively, the spindle opening 118 can include teeth along the interior surface, which can engage with axle teeth 126.

Although not shown, a coil spring can engage with the spindle 112 so that if no force is applied to the adjuster cable 114, the spindle 112 can rotate and draw back a length of adjuster cable 114.

Figure 3:
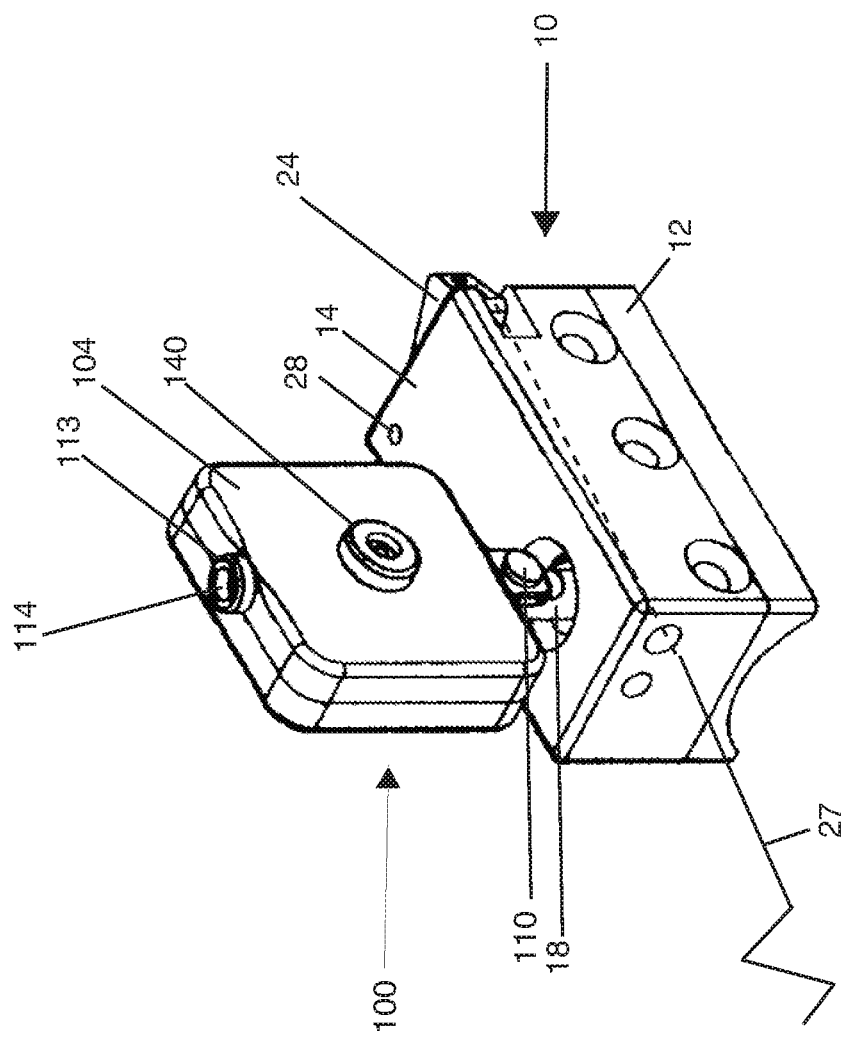
FIG. 3 is an unexploded view of both the rider restraint and the cable adjuster.

FIG. 3 illustrates both the rider restraint 10 and the cable adjuster 100 in unexploded views. FIG. 3 illustrates how the rider restraint 10 and the cable adjuster 100 interact with each other through the pin 110 and the ball catch 18.

Figure 4:
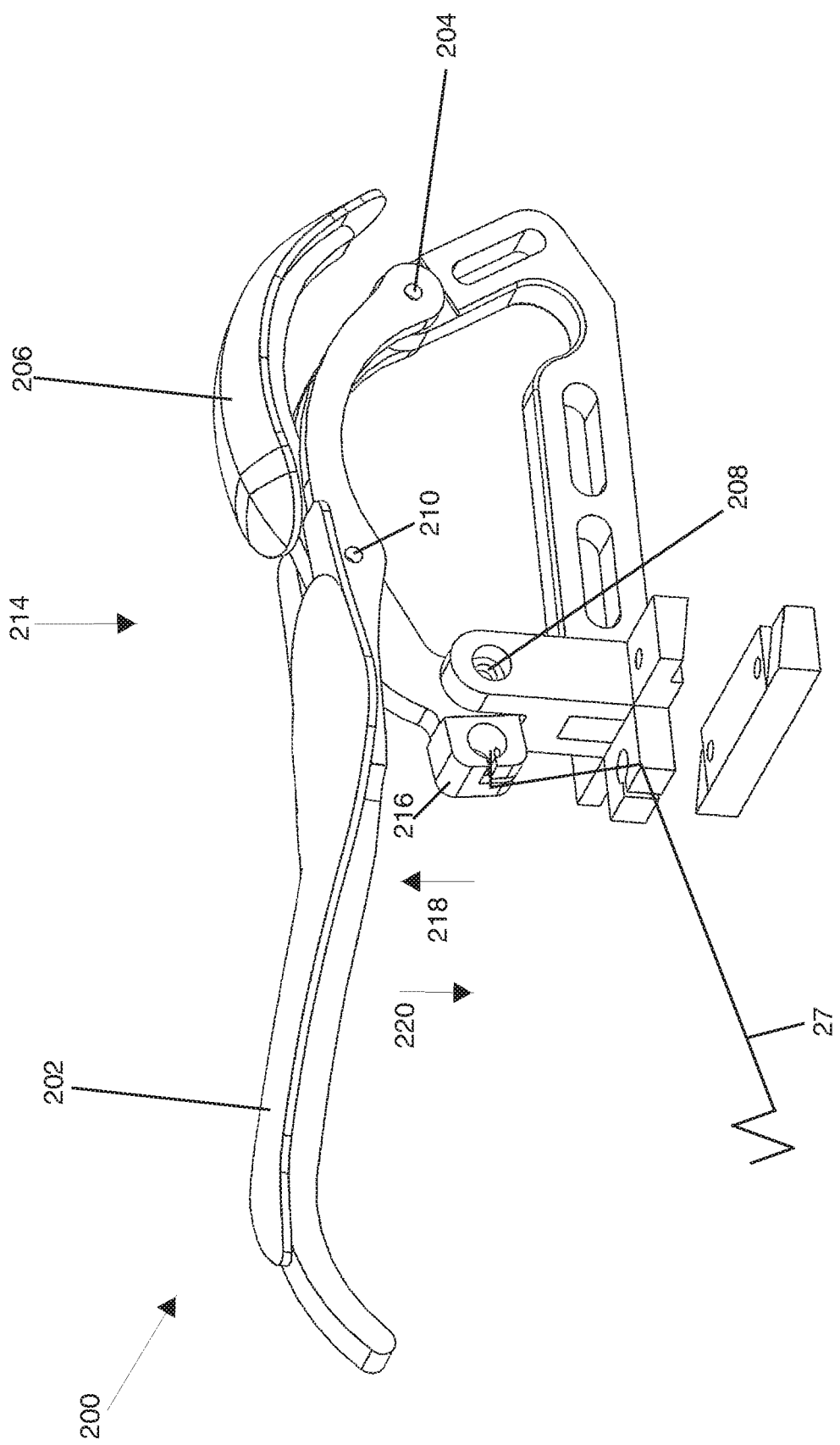
FIG. 4 illustrates a handle that interacts with the rider restraint and the cable adjuster.

FIG. 4 illustrates a handle 200 that interacts with the rider restraint 10 and the cable adjuster 100 through the cable 27. The handle 200 can be mounted on any portion of the bicycle, such as towards the front of the bicycle, such as on the handlebars and/or head tube, which is a place convenient for a rider to place their hand during use of the bicycle. In other embodiments, the handle 200 can be a portion of or near a seat of the bicycle, so that a rider can place their body weight on the handle 200.

The handle 200 includes a first arm 202, which is configured to rotate about hinge 204. Handle 200 also includes a second arm 206, which is configured to rotate about hinge 208. An arm pin 210 extends through a slot (shown in FIG. 5) in second arm 206, so that arm pin 210 maintains contact with the first arm 202, and slides along the length of the slot when a pressure is applied to either the first arm 202 or the second arm 206 in the direction of arrow 214.

To exert pressure in the direction of arrow 214, during operation, a user can place their hand, or other portion of their arm, on either the first arm 202 or the second arm 206. In other embodiments, to exert pressure in the direction of arrow 214, during operation, a user can place their body weight on either the first arm 202 or the second arm 206.

Figure 5:
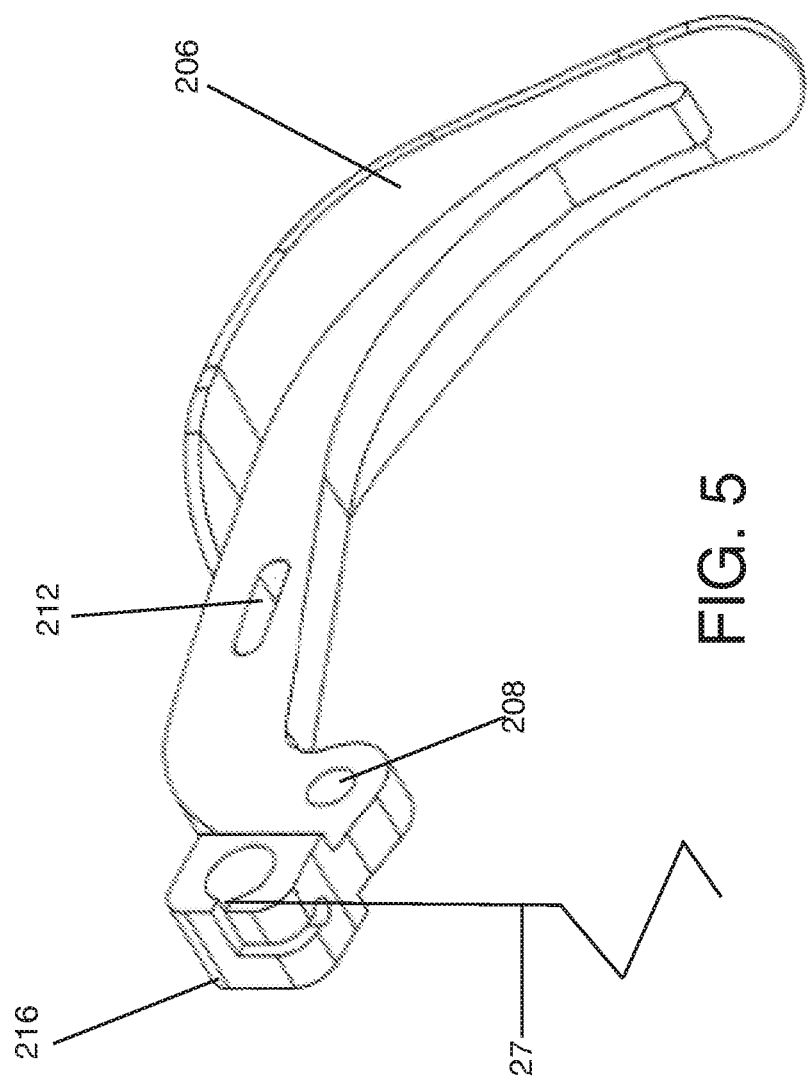
FIG. 5 illustrates a perspective view of a second arm.

Referring to FIG. 5, FIG. 5 illustrates a second arm 206 that is separate from handle 200. A slot 212 is shown, which extends along a distance of the second arm, with the slot 212 configured to accept the arm pin 210.

Referring back to FIG. 4, once a force is applied in the direction of arrow 214, the pin 210 slides along the slot 212, and a cable anchor 216 moves vertically upwards in the direction of arrow 218. Cable 27 is secured to cable anchor 216 in any suitable way.

When no force is applied in the direction of arrow 214, cable anchor 216 is drawn down in the direction of arrow 220, through a force received by the cable 27 caused by, referring to FIG. 1, the spring 31 causing the plunger 30 to move away from the transverse opening 15, which causes the pressing arm 24 to rotate counter-clockwise.

Since the spring 31 causes the plunger 30 to move away from the transverse opening 15, so that plunger tip 32 no longer contacts the ball portion 19, the ball catch 18 (and subsequently the cable adjuster 100) can move out of catch opening 16 and top 14. This movement also allows the user, who is attached to the end of the adjuster cable 114 to move away from the bicycle frame and rider restraint 10. Thus, if the user removes their hand from both the first arm 202 and the second arm 206, they are no longer tethered by adjuster cable 114 to the bicycle frame in the event of an accident or crash, or in the event the user wants to dismount the bicycle.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

The invention claimed is:

1. A rider securing device, the device comprising:
   a rider restraint, wherein the rider restraint is mountable to a portion of a bicycle, and wherein the rider restraint comprises a pressing arm configured to contact and move a plunger, when the plunger is in a first position, a ball catch is securable within a catch opening, when the plunger is in a second position, the ball catch is removable from the catch opening, wherein the pressing arm is configured to move the plunger to the first position through a pressure received from a first end of a cable;
   a cable adjuster configured to attach to the ball catch, wherein the cable adjuster comprises an adjustable amount of an adjuster cable; and
   a handle, the handle comprising a first arm and a second arm, wherein the first arm and the second arm are configured to move vertically upwards and downwards, wherein the second arm comprises a cable anchor configured to attach to the second end of the cable.

2. The device of claim 1, wherein the plunger goes from the first position to the second position through a force delivered by a spring.

3. The device of claim 1, wherein an end of the adjuster cable is configured to attach to a harness configured to be worn by a rider of the bicycle.

4. The device of claim 1, wherein the adjuster cable is configured to extend about a spindle within the cable adjuster, and wherein the spindle is configured to rotate about an axle.

5. The device of claim 4, wherein the adjuster cable is at a fixed length when the axle is in a first position and wherein the adjuster cable can be extended from the fixed length when the axle is in a second position.

6. The device of claim 5, wherein in the first position, a toothed portion of the axle engages with a toothed portion of the cable adjuster.

7. The device of claim 1, wherein movement of the first arm and the second arm vertically downwards exerts a pressure on the second end of the cable.

* * * * *